3,463,591
LASER SPECTROSCOPY
Peter A. Franken, Ann Arbor, Lee A. Cross, Northville, and Lloyd G. Cross, Ann Arbor, Mich., assignors to Lear Siegler, Inc.
Filed Oct. 10, 1962, Ser. No. 229,610
Int. Cl. G01j 3/30
U.S. Cl. 356—85     1 Claim The present invention relates to method and apparatus for determining the constituent elements of a sample of matter and more particularly to a method and apparatus for energizing a sample of matter to emit detectable electromagnetic spectra characteristic of its constituent elements.

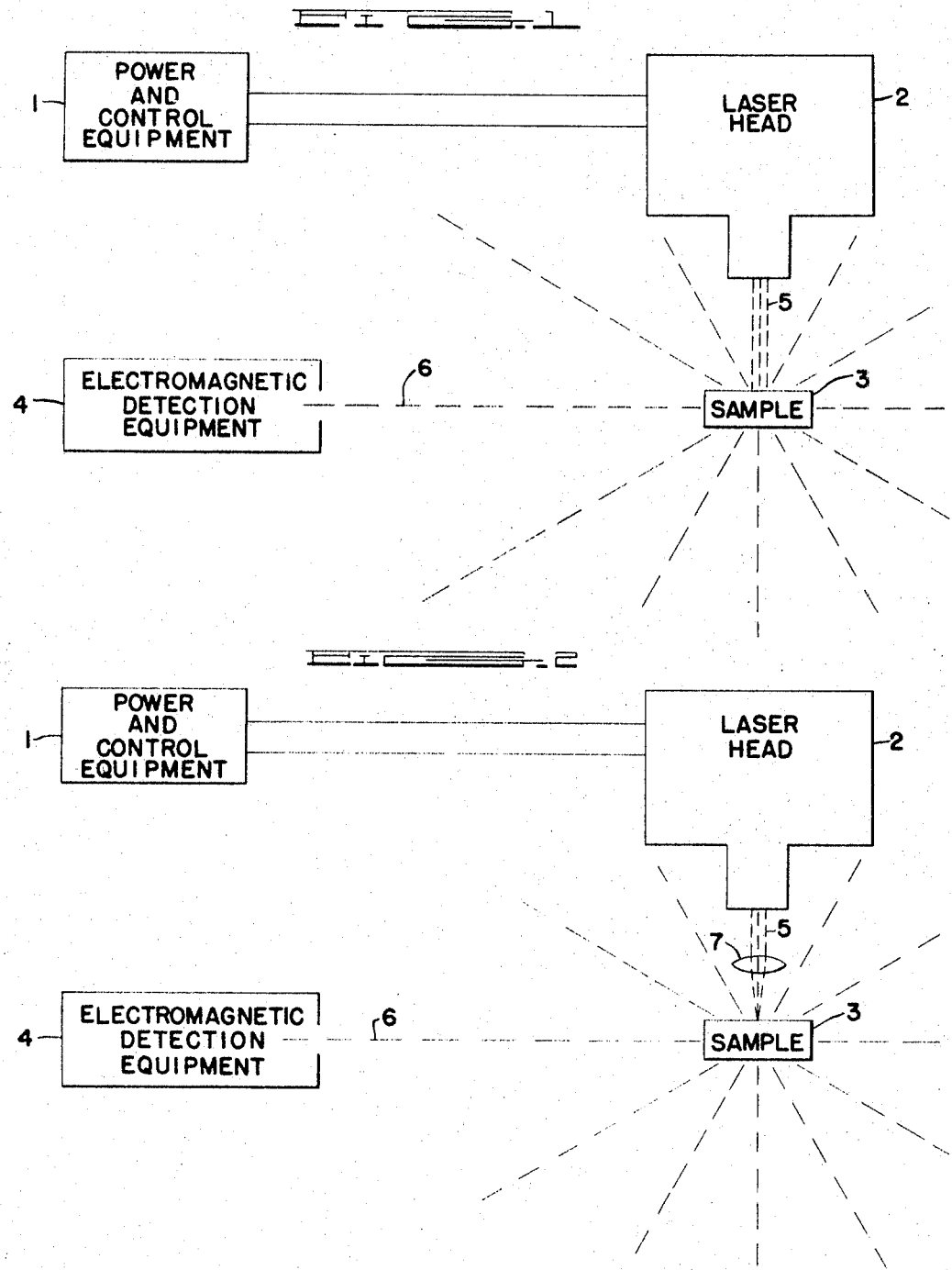

A convenient, conventional method of analyzing a sample of material to determine its constituent elements is by heating the sample to incandescence, as in a conventional arc or spark spectrum exciter and, while it is such state, observing it through a spectroscope to detect the lines of the visible spectrum characteristic of the specific elements of which the sample is composed. The present method and apparatus, however, are unable to satisfactorily accomplish the desired result with all samples of materials. Thus, while dielectric materials can be vaporized in a carbon arc, dielectric inclusions, such as magnesium oxide, in a substantially non-dielectric sample cannot be detected in such manner. Further, the low melting points of certain metals, such as beryllium, magnesium, and aluminum, cause them to melt before reaching incandescence, thus rendering them normally not amendable to this method of analysis. Still further, it is conventional to grind or cast steel samples into rods to facilitate spectrographic analysis to accord with present methods and apparatus, and this in time being consuming, expensive, and sometimes impossible without taking considerable material from the object under analysis in order to obtain a sample of the requisite size.

It is accordingly an object of the present invention to provide improved means for determining the elements composing a sample of any material.

Another object of the invention is to provide improved means for exciting a sample of material to emit electromagnetic energy at frequencies characteristic of the elements of which the sample is composed.

A further object of the invention is to provide means for substantially simultaneously exciting to incandescence all elements of a sample of any material of which spectrographic analysis is desired.

Still a further object of the invention is to provide a method for substantially simultaneously ionizing a sample of matter having any shape, size, state, and condition of latent energy and of determining the constituent elements thereof.

The above and other objects of the invention which will later become apparent as the following description proceeds, are attained by the present invention, preferred embodiments of which have been illustrated, by way of example only, in the accompanying drawings, forming a part of this specification, in which like characters are employed to designate like parts throughout the same, and wherein:

FIGURE 1 is a schematic diagram of a first embodiment of the invention showing a sample of matter excited by the energy output of a laser to emit energy in a form detachable by detection equipment.

FIGURE 2 is a schematic diagram of a second embodiment of the invention similar to that of FIGURE 1 but including an optical system arranged to focus upon a smaller area of the sample the energy output of the laser.

A maser may be defined as an aggregate of instrumentalities primarily adapted for amplifying or generating microwaves and being further of a design primarily adapted for operation below 40° (degrees) Kelvin, comprising (i) a solid which, at the operating temperature below 40° K., is paramagnetic and which is adapted for association with instrumentalities for creating an inversion in the population of certain energy levels in such solid, the amplifying or generating operating being by reason of the electromagnetic resonant characteristic of such solid; or (ii) means for producing a molecular beam and means for associating such molecular beam with instrumentalities for creating an inversion in the population of certain energy levels in such beam, the amplifying or generating operation being by reason of the molecular resonant characteristics of the molecules within such beam.

The term laser may be defined as a maser disposed to generate or amplify electromagnetic radiation in the optical spectrum; that is waves having a length of between approximately .4 and 1.1 microns. It is to be understood, however, that while a laser is shown and described in the preferred embodiments of the invention described herein and shown in the drawings, the principle of the present invention is not restricted to apparatus or methods employing a laser or optional maser but that forms of masers which generate or amplify waves outside of the optical spectrum may be employed without departing from the spirit and scope of the invention.

Referring now to FIGURE 1, there is shown a system in which the principles of the present invention are illustratively embodied. The system includes conventional laser power and control means 1, a conventional laser head 2, a sample 3 of matter the constituent elements of which are to be determined, and detection equipment such as a conventional spectroscope 4.

Power and control means 1 and laser head 2 may be of any conventional type, the construction, principle, and method of operation of which are now well known in the art. See, for example, "Optical Masers" by Arthur L. Schawlow, at pp. 52 through 61, inclusive, Scientific American, June 1961, volume 204, No. 6, published by Scientific American, Inc., 415 Madison Avenue, New York, N.Y. It is characteristic of a laser to produce efficient, low-noise, coherent, monochromatic infrared, visible, or ultraviolet waves in a narrow beam having a divergence of less than half a degree and energy presently of the order of ten thousand watts per square centimeter, in short bursts presently of the order of 50 nanoseconds.

Sample 3, analysis of the constitued elements of which is desired, is placed at the focus of the beam 5 of energy output from laser head 2. We have found it desirable in testing samples containing certain elements to surround the sample with a transparent enclosure (not shown), such as glass, and to control the atmosphere in which the investigation is conducted. The enclosure itself, being transparent, does not absorb any appreciable amount of the energy output of the laser.

Detection equipment, such as a conventional spectroscope 4, is arranged to detect energy emitted by sample 3. Laser head 2 is then triggered in the conventional manner, radiating in a beam 5, directed against sample 3, energy of the extremely high order of intensity characteristic of a laser. The energy received by sample 3 from laser head 2 is sufficient to vaporize, ionize, and heat the sample to an incandescent state practically instantaneously and of whatever material it may be composed. Melting of one of several compounds or elements within the sample before reaching incandescence is of no consequence since vaporization ensues before flow can occur. Even the most refractory materials now known, including dielectric inclusions therein, are vaporized, ionized, and rendered incandescent practically instantaneously.

For example, a ruby laser beam will transform a carbon sample in air at room temperatures to an incandescent vapor having a temperature of the order of eight thousand degrees centigrade (8,000° C.) in .0005 second.

Sample 3 is in its vaporized, ionized, incandescent state radiates electromagnetic energy 6 in the optical spectrum at wavelengths specifically characteristic of the elements of which the sample is composed, the spectra lines of which said wavelengths may be observed through spectroscope 4 and recorded and analyzed in the conventional manner. By substituting other forms of detection equipment for spectroscope 4, the method and apparatus may be employed in other analysis applications where heat is needed rapidly as, for example, gas chromatography.

Where sample 3 consists of a moving stream of material, such as a mixture of matter carried in a stream of inert gas, a continuous laser, such as the gas maser constructed by Ali Javan, W. R. Bennett, Jr., and Dr. R. Herriott and first published in February 1961, may be employed to continuously render vaporized, ionized and incandescent a sample of the stream, thus enabling the continuous spectroscopic detection of changes in the composition of the stream.

In the modified form of the invention shown in FIGURE 2, a transparent lens 7 is introduced between the output end of laser head 2 and sample 3. This focuses the output energy of the laser upon a very small area of sample 3 and greatly increases the intensity of energy per unit of that area, resulting in the vaporization, ionization, and incandescence of only that very small area of the sample. Energy intensities of the order of 10,000,000 to 100,000,000 watts per square centimeter have been published thus far as having been reached in this manner. This modified form of the invention is thus particularly adapted to analyze the composition of a minute portion of a larger object, on site and without the necessity of taking considerable material from the object to grind or cast a separate rod for sample use. The construction of a casting, for example, may be thus analyzed in the factory or after installation without moving the casting or destroying more than a minute sample of selected area of the surface thereof.

It is to be understood that the forms of the invention herewith shown and described are to be taken as preferred embodiments of the same and that resort may be had to various changes in construction without departing from the scope of the subjoined claims.

What is claimed is:

1. Apparatus for detecting the optical spectra characteristics of a sample of matter, including:
   a power source;
   a laser connected to said power source for emitting intense coherent electromagnetic energy;
   a transparent lens positioned outwardly of said laser for focusing the coherent energy therefrom upon a small area of said sample, thereby increasing the intensity of the energy impinging on said sample sufficiently to vaporize, ionize and render incandescent a portion of said sample, including any refractory inclusions therein, in a sufficiently short time to prevent flow of any melted material; and
   a spectroscope disposed with respect to said sample to detect the optical spectra characteristic of each of the constituent elements of said sample whilst the same are incandescent.

References Cited

UNITED STATES PATENTS 3,388,314   6/1968   Gould _____ 321—69

OTHER REFERENCES

Schawlow "Optical Masers," Scientific American, vol. 204, No. 6, June 1961, pp. 52–61.

Harrison et al. Practical Spectroscopy, pp. 180–181, Prentice-Hall, 1948, New York.

RONALD L. WIBERT, Primary Examiner